US012459794B1

(12) United States Patent
Avila

(10) Patent No.: US 12,459,794 B1
(45) Date of Patent: Nov. 4, 2025

(54) LIFTING SYSTEM AND RELATED METHODS

(71) Applicant: Antonio Avila, Glendale, AZ (US)

(72) Inventor: Antonio Avila, Glendale, AZ (US)

( * ) Notice: Subject to any disclaimer, the term of this patent is extended or adjusted under 35 U.S.C. 154(b) by 633 days.

(21) Appl. No.: 17/806,044

(22) Filed: Jun. 8, 2022

(51) Int. Cl.
*B66F 11/04* (2006.01)
*B66F 7/06* (2006.01)
*B66F 7/08* (2006.01)
*B66F 17/00* (2006.01)
*B66D 3/18* (2006.01)

(52) U.S. Cl.
CPC .............. *B66F 7/08* (2013.01); *B66F 7/0666* (2013.01); *B66F 11/042* (2013.01); *B66F 17/006* (2013.01); *B66D 3/18* (2013.01); *B66F 7/0625* (2013.01); *B66F 2700/09* (2013.01)

(58) Field of Classification Search
CPC .. B66D 3/18; B66C 1/62; B66C 13/18; B66C 17/00; B66C 23/005; B66C 23/48; B66F 11/042; B66F 17/006; A61G 3/062
USPC ................ 254/124; 182/414, 62.5, 69.5, 148
See application file for complete search history.

(56) References Cited

U.S. PATENT DOCUMENTS 4,356,887 A * 11/1982 Fisher ................... B66F 11/042 182/69.5
4,484,663 A * 11/1984 Wyse ........................ E06C 7/16 187/230
4,546,852 A * 10/1985 Martin .................. B66F 11/042 212/319
5,113,972 A * 5/1992 Haak, Sr. .................. B66F 3/22 248/69
5,865,426 A * 2/1999 Kazerooni ................ B66C 1/62 254/270
5,915,673 A * 6/1999 Kazerooni .............. B66F 3/242 254/270
11,724,275 B2 * 8/2023 Lim ...................... B05B 13/005 239/752
2002/0113448 A1 * 8/2002 Kazerooni ............... B66D 3/18 294/106
2004/0026349 A1 * 2/2004 Colgate .................... B66D 3/18 212/284

(Continued)

FOREIGN PATENT DOCUMENTS

CN 103896187 A * 7/2014
CN 106786132 B * 6/2018 .............. H02G 1/02

(Continued)

OTHER PUBLICATIONS

Work Done Against Gravity from Algebra Based Physics (Year: 2024).*

(Continued)

*Primary Examiner* — Mahdi H Nejad
(74) *Attorney, Agent, or Firm* — IPTechLaw

(57) ABSTRACT

Implementations of lift systems may include a lift assist device having a mast coupled to an arm. The lift assist device may be moveably coupled to a first track and a second track. Implementations of lift systems may include a lift coupled to and configured to raise the lift assist device. The first track and the second track may be coupled between the lift assist device and the lift. Implementations of lift systems may include a drive system coupled to the lift assist device. The drive system may be configured to move the lift assist device along the first track and the second track.

12 Claims, 6 Drawing Sheets

(56) References Cited

U.S. PATENT DOCUMENTS

| | | | | |
|---|---|---|---|---|
| 2006/0226106 | A1* | 10/2006 | Zaguroli | B66C 9/14 212/331 |
| 2011/0262261 | A1* | 10/2011 | Stewart | B66F 7/0625 414/800 |
| 2014/0263144 | A1* | 9/2014 | Crain | B66C 23/42 212/223 |
| 2016/0068371 | A1* | 3/2016 | Schwabenthan | B66C 23/68 212/284 |
| 2017/0283229 | A1* | 10/2017 | Shi | B66F 11/042 |
| 2020/0369494 | A1* | 11/2020 | Peters | B66C 23/26 |
| 2021/0354633 | A1* | 11/2021 | Cowan | B66F 7/065 |
| 2022/0281730 | A1* | 9/2022 | Masuda | B66F 11/04 |
| 2022/0371868 | A1* | 11/2022 | Barlow | B66F 17/006 |

FOREIGN PATENT DOCUMENTS

| | | | | | |
|---|---|---|---|---|---|
| CN | 108100960 | A | * | 6/2018 | B66F 11/042 |
| CN | 109928322 | A | * | 6/2019 | |
| CN | 110314784 | A | * | 10/2019 | |
| CN | 118811718 | A | * | 10/2019 | |
| CN | 111392639 | A | * | 7/2020 | B66F 7/0625 |
| CN | 112027984 | A | * | 12/2020 | B66D 3/18 |
| CN | 212740608 | U | * | 3/2021 | |
| CN | 214299166 | U | * | 9/2021 | |
| CN | 113716500 | A | * | 11/2021 | |
| CN | 114940459 | A | * | 8/2022 | |
| CN | 115557399 | A | * | 1/2023 | B66C 23/52 |
| CN | 218320459 | U | * | 1/2023 | |
| CN | 220201225 | U | * | 12/2023 | |
| DE | 19647908 | A1 | * | 3/1998 | B66F 11/042 |

OTHER PUBLICATIONS

A Mobile Spraying Robot With Telescopic Mechanical Arm for the Ship Surface Coating; Patent No. 110314784; Document ID: CN 110314784 A; Date Published: Oct. 11, 2019; Inventor Name: Zi, Bin; Application No. CN 201910633847 A; Date Filed: Jul. 15, 2019 (Year: 2019).*

Terex Corporation, Genie, Rough Terrain Scissor Lifts, Accessed on Jun. 8, 2022 at https://www.genielift.com/en/aerial-lift/rough-terrain-scissor-lifts.

* cited by examiner

LIFTING SYSTEM AND RELATED METHODS

BACKGROUND

1. Technical Field

Aspects of this document relate generally to lifting systems. More specific implementations involve lifting systems configured for use in masonry.

2. Background

Lifting systems are used to raise and lower a person or object. Lifting systems are utilized in a number of industries, including the construction industry. Examples of lifting systems include cranes, forklifts, and jacks.

SUMMARY

Implementations of lift systems may include a lift assist device having a mast coupled to an arm. The lift assist device may be moveably coupled to a first track and a second track. Implementations of lift systems may include a lift coupled to and configured to raise the lift assist device. The first track and the second track may be coupled between the lift assist device and the lift. Implementations of lift systems may include a drive system coupled to the lift assist device. The drive system may be configured to move the lift assist device along the first track and the second track.

Implementations of lift systems may include one, all, or any of the following:

The lift assist device may be configured to apply a lifting force equal to an amount of weight of an item to be lifted.

The lift assist device may include a plurality of wheels configured to roll along the first track and the second track.

The drive system may include a sensor configured to detect a position of the lift assist device. The drive system may be configured to automatically stop movement of the lift assist device along the first track and the second track when the sensor detects a position of the lift assist device.

The lift may be a scissor lift.

The first track and the second track may each include a length of 16 feet or more.

The drive system may be configured to be operated by a user remotely.

Implementations of lift systems may include a lift assist device moveably coupled to and on a first track and a second track. The lift assist device may include an arm coupled to a mast, a base coupled to the mast, and four wheels coupled to the base and configured to roll along the first track and the second track. Implementations of lift systems may include a lift coupled to and configured to raise the first track and the second track. Implementations of lift systems may include a drive system coupled within a base of the lift assist device. The drive system may be configured to move the lift assist device along the first track and the second track.

Implementations of lift systems may include one, all, or any of the following:

The lift assist device may be programmable to apply a lifting force equal to an amount of weight of an item coupled to a load attachment mechanism of the lift assist device.

The drive system may include a motor coupled within the base of the lift assist device.

The lift system may include a stop configured to prevent movement of the lift assist device from off of the track.

The lift may be a scissor lift.

The first track and the second track may each include a length of 16-24 feet.

The drive system may be configured to be operated by a user remotely. Implementations of lift systems may include a lift assist device moveably coupled to and along a first track and a second track. The lift assist device may include an arm coupled to a mast, a base coupled to the mast, and four wheels coupled to the base and configured to roll along the first track and the second track. Implementations of lift systems may include a track system including the first track and the second track and a plurality of supports coupled over and orthogonal to a first lift track, a second lift track, a third lift track, and a fourth lift track. Implementations of the lift system may include a scissor lift having a first arm directly and moveably coupled to the first lift track, a second arm directly and moveably coupled to the second lift track, a third arm directly and moveably coupled to the third lift track, and a fourth arm directly and moveably coupled to the fourth lift track. Implementations of the lift system may also include a drive system coupled within the base of the lift assist device. The drive system may be configured to move the lift assist device along the first track and the second track.

Implementations of lift systems may include one, all, or any of the following:

The plurality of supports may include five supports directly coupled to both the first track and the second track.

The drive system may include a motor coupled to a first gear and a second gear. The second gear may be fixedly coupled to an axle shaft. The axle shaft may be fixedly coupled to a third gear. The third gear may be configured to rotate along a gear track fixedly coupled to one of the first track or the second track.

The drive system may be electrical.

The lift assist device may be electrical.

Each wheel of the four wheels may be coupled between two plates.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended lifting systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such lifting systems, and implementing components and methods, consistent with the intended operation and methods.

Particular implementations of the lifting system disclosed herein may be configured for use in the field of masonry. In such implementations, the lifting systems disclosed herein may be configured to lift blocks. In particular implementations the blocks may be 8 inch by 8 inch by 16 inch blocks, 12 inch by 8 inch by 16 inch blocks, 8 inch by 8 inch by 32 inch blocks, 12 inch by 8 inch by 32 inch blocks, 12 inch by 8 inch by 18 inch blocks, or any other size of block. In various implementations the blocks may weigh between 26 pounds and 135 pounds. In other implementations the blocks may weigh less than 26 pounds or more than 135 pounds. In particular implementations the blocks may weigh 76 pounds. Such lifting systems may increase productivity and efficiency within the field of masonry as the lifting system will assist masons in lifting blocks rather than the masons having to do all of the manual lifting. It is also understood that the lifting systems disclosed herein may be utilized in fields aside from masonry and may be configured to lift objects other than blocks.

Figure 1:
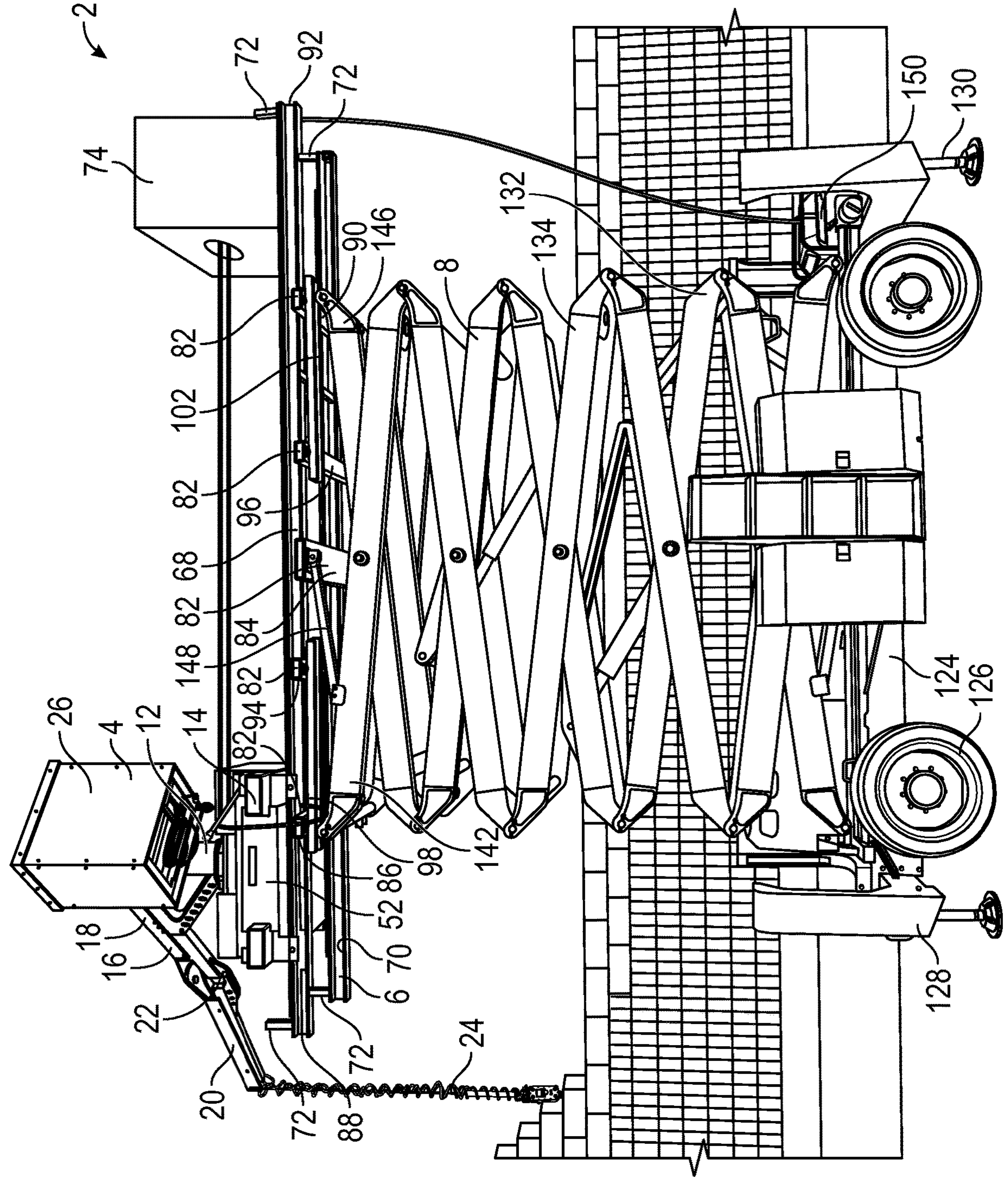
FIG. 1 is a side view illustration of a lifting system in a lifted position.
Figure 2:
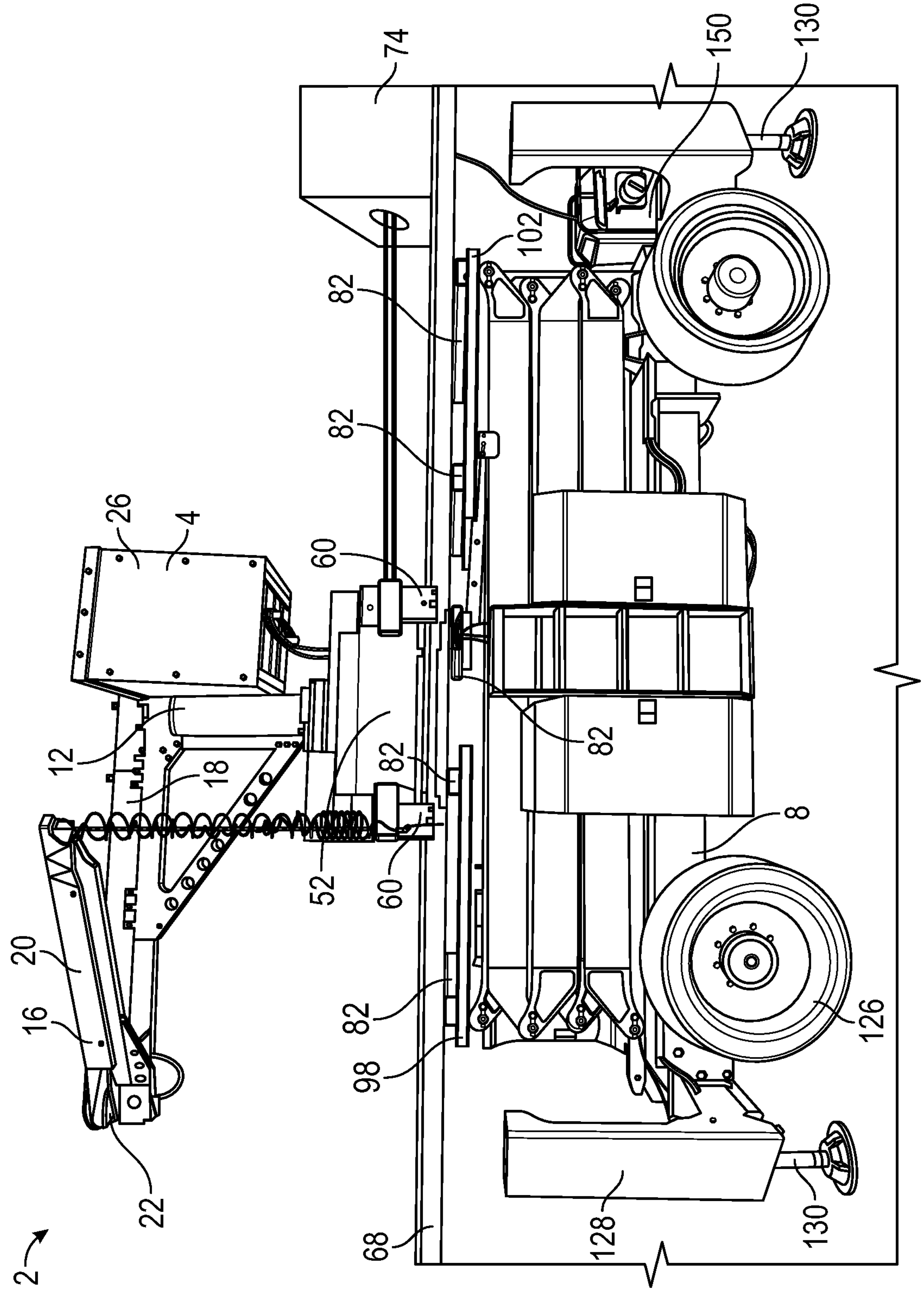
FIG. 2 is a side view illustration of the lifting system of FIG. 1 in a lowered position.

Referring to FIG. 1, a side view of a lifting system in a lifted position is illustrated, and referring to FIG. 2, a side view of the lifting system in a lowered position is illustrated. The lifting systems 2 disclosed herein include a lift assist device 4 coupled to a track system 6. In various implementations the track system 6 may be coupled to a lift 8 configured to raise and lower both the track system and the lift assist device coupled over the track system. The lifting system 2 may also include a drive system 10 (not illustrated by FIGS. 1-2 but illustrated by FIGS. 3-4 and 6) coupled to the lift assist device and the track system and configured to move the lift assist device along the track system.

Still referring to FIGS. 1-2, in various implementations the lift assist device includes a mast 12 coupled between a base 14 of the lift assist device and an arm 16 of the lift assist device. In various implementations the mast 12 may be freely rotatable relative to the base 14. In other implementations, the mast 12 may be rotatable but not freely rotatable relative to the base 14. In such implementations, the mast 12 may include a locking mechanism that prevents the mast 12 from rotating when engaged.

In various implementations the arm 16 may include a first portion 18 directly coupled to the mast 12 and a second portion 20 pivotally coupled through a joint 22 to the first portion 18. In such implementations, the first portion 18 in conjunction with the second portion 20 of the arm may extend the reach and the maneuverability of the lift assist device. In other implementations, the arm may include only a single portion. In such implementations, the length of the single portion may be fixed or may be configured to telescopically extend from the mast.

In various implementations, the lift assist device includes a lift assist drive configured to assist in lifting a load coupled to an end of a cable 24 that extends along the length of the arm 16. In various implementations, the lift assist drive may include a controller configured have the lift assist drive apply a predetermined amount of a lifting force. In particular implementations, the lift assist drive may be configured to apply a lifting force equal to the weight of an object to be lifted (and in turn, may also be programmable via the controller to apply a lifting force equal to an amount of weight of an object to be lifted). In such implementations, the object lifted by the lift assist device may feel weightless as the weight of the object is counteracted by the lifting force of the lift assist device which may be equal to the weight of the object. Because the lift assist device can lift the weight of the object to be lifted and can be programmed to only lift that amount of weight, when the lift assist device lifts an object the object may be easily handled by a user by applying minimal amounts of force upwards or downwards on the block to move the block. In various implementations, and as illustrated by FIG. 1, the lift assist drive may be coupled within a lift assist drive housing 26.

Figure 5:
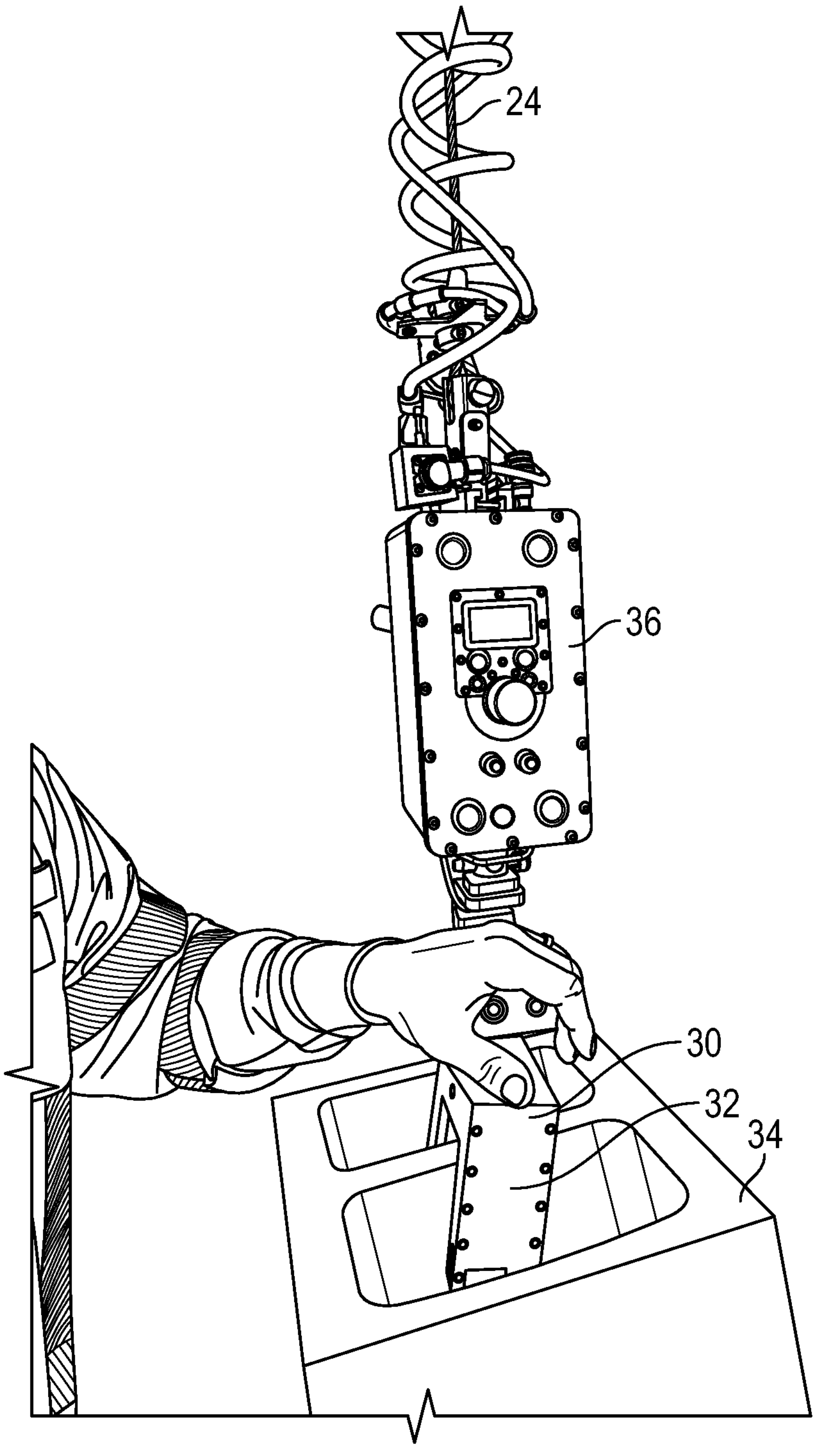
FIG. 5 is an illustration of a load attachment mechanism of the lift assist device of FIG. 1.

Referring to FIG. 5, the load attachment mechanism of the lift assist device of FIG. 1 is illustrated. In various implementations the lift assist device includes a load attachment mechanism 30 coupled to the cable 24. In various implementations the load attachment mechanism includes a grip device 32 configured to clamp on to an object, such as a block 34, to be lifted. In other implementations the load attachment mechanism may include a mechanism different from a grip device used to attach to a load. Such a mechanism may include, by non-limiting example, a hook, a strap, a platform or cage that the load rests upon or in, or any other type of mechanism configured to attach to a load.

In various implementations, and as illustrated by FIG. 5, the load attachment mechanism may be coupled to a controller 36. The controller may be configured to receive input data to control how much lifting force the lift assist driver is supposed to apply to the load. In various implementations, the controller may also be configured to open and close the grip device 32 configured to secure the object to be lifted.

Figure 3:
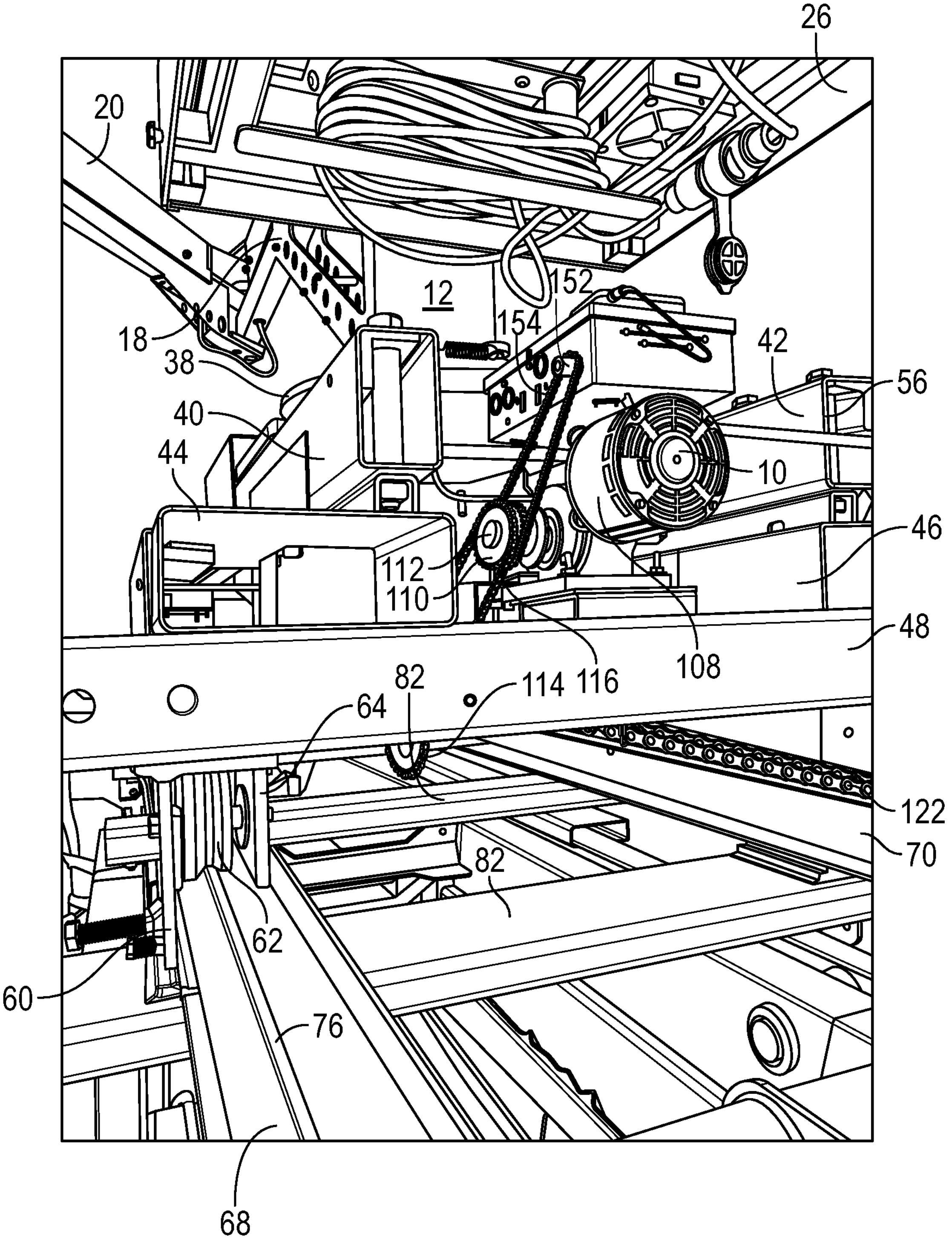
FIG. 3 is a rear view illustration of the lift assist device of FIG. 1.
Figure 4:
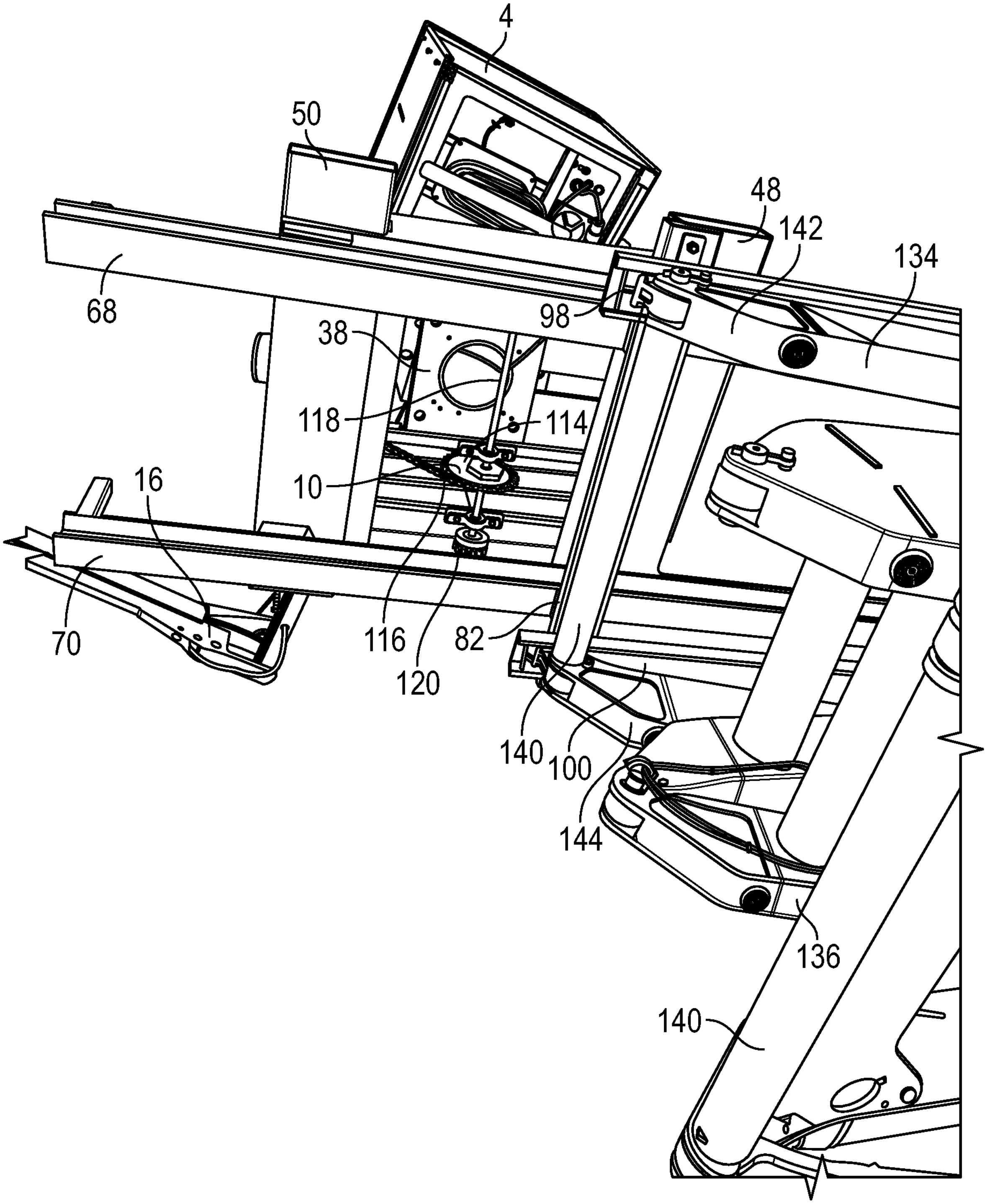
FIG. 4 is a bottom view illustration of the track system and lift assist device of FIG. 1.

Referring back to FIGS. 1-2, various implementations of the lift assist device include a base 14. As illustrated by FIGS. 1-2, the mast 12 may be mounted directly on the base 14. Referring to FIG. 3, a rear view of the lift assist device of FIG. 1 is illustrated and referring to FIG. 4, a bottom view of the track system and lift assist device of FIG. 1 is illustrated. As illustrated by FIGS. 3-4, in various implementations the base 14 may include a plate 38 directly coupled to the mast 12. The plate 38 may be directly coupled to a first support 40 and a second support 42. The first support 40 and the second support 42 may run parallel to one another. In various implementations the base may include a third support 44 and a fourth support 46. The third support 44 may be directly coupled to and below the first support 40 and the fourth support 46 may be directly coupled to and below the second support 42. The third support 44 and the fourth support 46 may run parallel to one another. In various implementations, the third support 44 and fourth support 46 may run parallel to the first support 40 and the second support 42. In other implementations, the third support 44 and the fourth support 46 may run perpendicular to the first support 40 and the second support 42. In various implementations, the base may also include a fifth support 48 and a sixth support 50. The fifth support 48 and the sixth support 50 may be directly coupled to and below the third support 44 and the fourth support 46. In various implementations where the first support 40 and second support 42 are parallel to the third support 44 and fourth support 46, and as illustrated by FIG. 3, the fifth support and the sixth support may run perpendicular to the first support 40, second support 42, third support 44, and fourth support 46. In other implementations, the fifth support 48 and the sixth support 50 may run parallel to the third support 44 and the fourth support 46.

In other implementations, rather than six different supports the base may include only two supports, three supports, four supports, or any other number of supports. In the various implementations disclosed herein, the plurality of supports within the base 14 may form a frame configured to house a drive system. The plurality of supports in various implementations may create the space within the base necessary to house a drive system. In other implementations not including the same number of supports as illustrated, the supports may be taller than the supports illustrated in order to provide the necessary room for the drive system. In still other implementations, the base may include fewer supports and less space therein and the drive system may be housed outside of the base 14.

Figure 6:
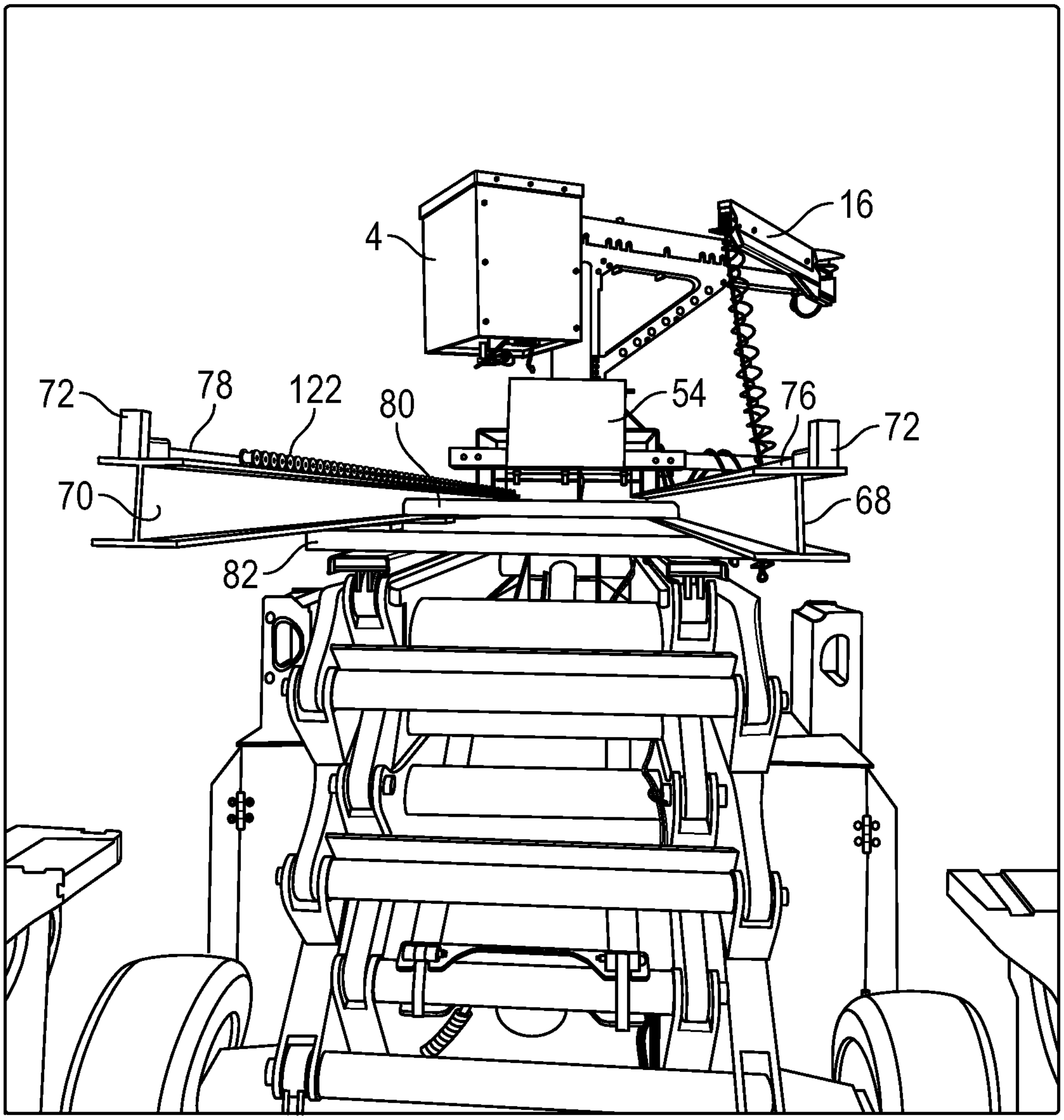
FIG. 6 is a front view illustration of the lift assist device of FIG. 1.

In various implementations the base 14 may include one or more walls coupled to the plurality of supports that form at least a partially closed housing about the base. Referring to FIG. 1, the base 14 may include a first wall 52 coupled to a first side of the base and a second wall opposite the first wall 52 coupled to a second side of the base. Referring to FIG. 6, a front view of the lift assist device of FIG. 1 is illustrated. As illustrated, in various implementations the base 14 may include a third wall 54 coupled between the first side and second side of the base. Referring to FIG. 3, in various implementations the fourth side 56 of the base opposite the third wall 54 coupled to the third side of the base may be open. In such implementations, the opening may provide room for the drive system and access to the drive system. In other implementations the fourth side 56 may include a fourth wall and the interior of the base may be more fully enclosed. In implementations including four walls, any of the four walls may be removable or may include a door, thus providing access to the drive system.

In various implementations, the lift assist device 4 may include four wheels 58 coupled below the base 14 and configured to roll along a first track and a second track. In various implementations, each of the four wheels may be coupled between two plates. The outer plates 60 coupled next to two wheels coupled over the first track is illustrated in at least FIG. 2. Referring to FIG. 3, a wheel 62 is illustrated coupled between an outer plate 60 and an inner plate 64. Each wheel of the four wheels may be similar to the wheel 62. In various implementations, each of or any of the outer plates 60 may include a pin 66 (which may include a bolt as illustrated in FIG. 3) extending through the outer plate and below a portion of the track coupled below the wheel. In such implementations, the pin 66 may prevent the lift assist device from being lifted off of and falling from the first track and second track. In other implementations the pin 66 may extend through the inner plates and below a portion of the corresponding track.

In various implementations, the lift assist device may be configured to lift up to 150 pounds. In other implementations, the lift assist device may be configured to lift more than 150 pounds.

In various implementations, the lift assist device is electrically powered. In such implementations, the lift assist device may be battery powered or configured to plug into a power source, such as a generator 150.

In various implementations, the lift assist device disclosed herein may be the same as or similar to the building element lift enhancer disclosed in U.S. Pat. App. Pub. No. 2020/0369494 entitled "Building Element Lift Enhancer" to Peters et al., filed on Feb. 11, 2020, the disclosure of which is hereby incorporated entirely herein by reference. More specifically, in various implementations the elements of the lift assist device aside from the base and wheels may be the same as the corresponding elements of the building element lift enhancer disclosed in U.S. Pat. App. Pub. No. 2020/0369494. In other implementations, the lift assist device may include a device different from the building element lift enhancer such as a davit crane or other lift assist device including a drive, mast, arm, cable, and load attachment mechanism.

Still referring to FIGS. 1-2, the implementations of the lifting system 2 disclosed herein include a track system 6. The track system 6 includes a first track 68 and a second track 70. The lift assist device may be moveably coupled along the length of the first track 68 and the second track 70. In various implementations, the length of each track may be 16 feet, 18 feet, 20 feet, 24 feet, between 16-24 feet, less than 16 feet, or more than 24 feet. In various implementations, the first track 68 and the second track 70 may each include an I-beam. In other implementations, the first track and the second track may include non-I-beam tracks.

In various implementations, and as illustrated by at least FIG. 1, the track system may include a stop 72. The stop 72 may be configured to prevent the lift assist device from moving or rolling off an end of the track system. In various implementations, the stop system 72 may include a post extending upwards from an end of the first track, the second track, or the first and second track. In various implementations, the track system may include a stop at each end of the tracks. In implementations of the track system including a cord box 74, the cord box may serve as the stop at an end of the tracks.

In other implementations, rather than including a physical stop, the track system may include an electrical stop. In such implementations, the track system may include one or more sensors positioned along the track. The one or more sensors may be configured to detect either the lift assist device or a detectable device coupled to the lift assist device (such as, by non-limiting example, an RFID tag). Upon detecting either the lift assist device or the detectable device coupled to the lift assist device, the one or more sensors may transmit a stop signal to a controller of the drive system which may then stop movement of the lift assist device along the track system. In other implementations, the lift assist device may include the sensors and the detectable device may be coupled to the first track 68 or the second track 70. The sensors and/or detectable devices may be coupled to portions of the track and/or lift assist device in positions that allow the lift assist device to be stopped at the ends of the tracks.

Referring to FIGS. 3 and 6, the first track 68 may include a first rail 76. In such implementations, two of the four wheels of the lift assist device may each include a recess therein configured to receive the rail of the first track, as illustrated by FIG. 3. Similarly, and referring to FIG. 6, the second track 70 may include a second rail 78 and two of the four wheels of the lift assist device may each include a recess therein configured to receive the rail of the second track. The rails fitting within the recesses, or grooves, of the wheels may secure the lift assist device to the track system. In other implementations, the first track and the second track may include a recess, or groove, configured to receive the four wheels of the lift assist device.

In various implementations, the track system 6 includes one or more braces 80 coupled directly to and in between the first track 68 and the second track 70, as illustrated by FIG. 6.

In various implementations, and referring to FIGS. 1-4 and 6, the track system 6 includes one or more track supports 82 directly coupled to and below the first track 68 and the second track 70. In various implementations, the track supports 82 may include a first support 84 directly and fixedly coupled to the first track 68 and the second track 70 at the center of the first track and the second track. The track supports 82 may also include a second support 86 closest to a first end 88 of the lift system 2 and a third support 90 closest to the second end 92 of the lift system. In various implementations, the track supports may include a fourth support 94 coupled between the first support 84 and the second support 86 and a fifth support 96 coupled between the first support 84 and the third support 90. In various implementations, each support of the track supports may be perpendicular to the first track 68 and the second track 70.

In various implementations including a scissor lift, the track system 6 may include a first lift track 98 and a second lift track 100 directly coupled to and below the second support 86 and the fourth support 94. The first lift track 98 may be configured to receive an end of a first arm of a scissor lift and the second lift track 100 may be configured to receive an end of a second arm of a scissor lift. The ends of the first arm and second arm may be configured to move within and along the first lift track 98 and the second lift track 100. Similarly, in particular implementations, the track system may include a third lift track 102 and a fourth lift track (not illustrated) similar to the third lift track. The third lift track 102 may be configured to receive an end of a third arm of a scissor lift and the fourth lift track may be configured to receive an end of a fourth arm of a scissor lift. The ends of the third arm and fourth arm may be configured to move within and along the first lift track 98 and the second lift track 100. In such implementations, as the scissor lift raises or lowers, the distance between the end of the first am and the end of the third arm (and also the distance between the end of the second arm and the end of the fourth arm) either decreases or increases. The first lift track 98, second lift track 100, third lift track 102, and fourth lift track allows the ends of the arms of the scissor lift to still be directly coupled to the track system and support the track system while also allowing the scissor lift to raise and lower through allowing the ends of the scissor lift arms to move within the lift tracks.

In other implementations, the track system 6 may include lift tracks on only the ends of the first arm and second arm or on only the ends of the third arm and fourth arm. In such implementations the scissor lift may not include a sub-arm directly coupled to a first support, or middle support, of the track supports. The scissor lift may be configured to raise and lower by having the ends of two arms of the scissor lift move within either the first and second lift tracks or the third and fourth lift tracks.

In other implementations, the track supports may include fewer than five supports or more than five supports. In particular implementations, the track system may not include track supports directly coupled to and below the first track 68 and the second track 70 but may instead include braces directly coupled to and between the first track and the second track and may also include any lift tracks disclosed herein directly coupled to and below the first track and the second track.

In various implementations, the track system 6 may include a cord box 74. The cord box 74 may include one or more retractable cord reels configured to automatically wind cords thereon extending to the drive system 10 that moves the lift assist device along the first track and the second track and/or the drive for the lift assist device that assists in the lifting of objects. In various implementations, the one or more retractable reels may also include one or more reels to automatically wind cords thereof extending between the cord box 74 and a generator 150. In other implementations, the lift system 2 may not include a cord box having retractable reels.

Referring to FIGS. 3-4, the lift system 2 includes a drive system 10 configured to move the lift assist device along the first track and the second track. The drive system includes a motor 108. The motor 108 may be included within a base 14 of the lift assist device. The motor may be configured to turn a shaft 112 in both a first direction and a second direction. The drive system 10 may include a first gear 110 fixedly and directly coupled to the shaft 112. The first gear may be coupled to a second gear 114 through a chain 116 and the second gear may be configured to rotate with the first gear through the chain. The second gear 114 may be fixedly and directly coupled to an axle shaft 118 which may be fixedly and directly coupled to a third gear 120. The third gear 120 may rotate with the second gear 114. The third gear 120 may be configured to rotate along a gear track 122 fixed along a length of the second track. In other implementations, the gear track may be fixed to the first track. In particular implementations, the gear track 122 may include a chain laid flat and secured to one of the tracks. In implementations including the third gear 120 and the gear track 122, the third gear 120 may move the lift assist device along the first track 68 and the second track 70 as the third gear rotates along the gear track 122. In various implementations, the drive system may include a limit switch 152. The limit switch 152 may be coupled to the shaft 112 via a second chain 154. In various implementations the drive system may be programmed (through a controller) to automatically stop the lift assist device at predetermined points on the track. In such implementations, the lift assist device may be configured to stop through the limit switch 152.

In various implementations, the drive system 10 includes a controller configured to receive a signal or input from a user to move the lift assist device in a first direction along the track system, in a second direction along the track system, or to stop movement of the lift assist device along the track system. In various implementations, the drive system may include a remote control configured to transmit a signal to a receiver which then relays the signal to move the lift assist device in either direction or stop the lift assist device. The remote control may be configured to strap, or otherwise attach, to a user's arm. In such implementations, a user of the lift system 2, such as a mason, may be able to remotely operate movement of the lift assist device in a lateral motion along the tracks. This may improve efficiency as the user need not move from the position they are working at in order to have the lift assist device move in order to accommodate further use of the lift assist device.

In other implementations, the drive system 10 may include other mechanisms configured to move and stop the lift assist device along the first track 68 and the second track 70. For example, the drive system could include an axle shaft directly coupled to one or two of the four wheels of the lift assist device and may be configured to move the lift assist device through rotation of one or more wheels. In still other implementations, the drive system may include a threaded rod extending along a length of the track system 6. In such implementations, the drive system may also include a nut non-rotatably fixed to the threaded rod and the lift assist device. In such implementations, the threaded rod may rotate and impart lateral movement to the nut and the lift assist device along the track system. In other implementations, the threaded rod may be non-rotatable and the nut coupled over the threaded rod may be configured to rotate and move along the length of the threaded rod. The nut may also be coupled to the lift assist device and may be configured to move the lift assist device along the track system as the nut moves along the threaded rod. In still other implementations, the drive system 10 may include other mechanisms configured to move the lift assist device along the first track 68 and the second track 70.

The drive system may be electrically powered. In such implementations the drive system may be battery powered or configured to plug into a power source, such as a generator. In other implementations, the drive system may be solar powered. In such implementations, the drive system may include one or more solar panels coupled to the lifting system. In particular implementations, the drive system may include one or more solar panels coupled over the lift assist drive housing 26. The solar panels may be used to charge a battery that may be used to power the drive system. In various implementations, the drive system may be solar powered and the lift assist drive system may be powered through a generator. In other implementations, the lift assist drive system and the drive system may both be solar powered.

In various implementations, the lift system may include a lift 8 directly coupled to the track system 6 and configured to raise and lower the track system 6 and the lift assist device 4. In particular implementations, the lift 8 may be a scissor lift. In other implementations the lift may include a lifting mechanism different from a scissor lift, such as, by non-limiting example, lifts having a telescopic boom or articulating boom.

In various implementations, the lift may include a chassis 124 coupled to four wheels 126. The lift may also include a motor and drive system configured to move the lift in a lateral direction. Accordingly, the lift assist device can be moved laterally via the drive system 10 and along the tracks or via lateral movement of the lift 8. In particular implementations, the lift 8 may move the lift assist device 4 into a general position and the user of the lift system may move the lift assist device along the track system in order to more easily and quickly reposition the lift assist device as compared to having to move the entire lift system via lateral movement of the lift 8. This is particularly true in implementations where the lift includes an anchoring system, such as is described herein, that would have to be set, unset, and then reset every time the entire lift system is moved laterally.

Still referring to FIG. 1, the lift 8 may include an anchoring system 128. The anchoring system 128 may include a plurality of legs 130 configured to be lowered and assume some of or all of the weight of the lift system 2. The anchoring system may be configured to anchor the lift system through placing some of or all of the weight of the lift system on the plurality of legs 130 rather than the wheels 126. Further, the anchoring system may be configured to level the lift system as each leg of the plurality of legs may be configured to raise or lower independently of the other legs of the plurality of legs.

In implementations where the lift system is a scissor lift, the scissor lift includes a plurality of scissor lift arms 132. The plurality of scissor lift arms may include a first set 134 of scissor lift arms on a first side of the scissor lift and a second set 136 of scissor lift arms on a second side of the scissor lift. Each arm of the first set of scissor lift arms may cross another arm of the first set of scissor lift arms in a middle of the arm. Similarly, each arm of the second set of scissor lift arms may cross another arm of the second set of scissor lift arms in a middle of the arm. The first set of scissor lift arms and the second set of scissor lift arms may be coupled together through a plurality of braces 140.

The scissor lift includes a lifting drive system configured to raise and lower the scissor lift arms. In various implementations, the lifting drive system may include hydraulics or other mechanisms configured to raise and lower the scissor lift arms.

In various implementations, the scissor lift includes a first arm 142 configured to directly and moveably couple to and within the first lift track 98, a second arm 144 configured to directly and moveably couple to and within the second lift track 100, a third arm 146 configured to directly and moveably couple to and within the third lift track 102, and a fourth arm configured to directly and moveably couple to and within the fourth lift track.

In various implementations the scissor lift may include a first sub-arm 148 coupled between the first arm 142 and the first support 84 of the plurality of track supports and a second sub-arm coupled between the second arm 144 and the first support 84 of the plurality of track supports.

In various implementations, the scissor lift disclosed herein may be the same as or similar to any scissor lift marketed under the tradename of GENIE® by Terex Corporation of Norwalk, Connecticut.

In various implementations the lift may be gas or diesel powered. In other implementations the lift may be electrically powered.

In other implementations of lift systems, the lift system configured to raise and lower the lift assist device may be coupled over the track system. In such implementations, the lift mechanism may be moved laterally along the track system with the lift assist device. In still other implementations, the lift system may not include a lift element to the lift but may instead only include a track system having a lift assist device coupled thereon. The track system may include a base including a plurality of wheels and an anchoring system that may be similar to the wheels or anchoring system of the lifts disclosed herein.

In the various implementations of lift systems disclosed herein, the lift systems may increase efficiency and productivity of laborers within different industries. In the particular implementation of the masonry industry, the lift system may be used to assist in lifting blocks, and in turn, take much of the lifting burden off of the actual mason. As a result, the lift system may improve the efficiency of the mason and masonry crew. Further, because the lift assist device is mounted over a track system, the lift assist device may be readily and easily utilized by a mason (or other user) by quickly readjusting the position of the lift assist device along the track system. Regular adjustments in position of the lift assist device may be necessary in implementations where the lift assist device needs to be utilized to lift objects located in different locations (such as blocks being used in the construction of a block wall). This readjustment may be made without having to readjust the position of the entire lift system. This may save significant amounts of time, especially in implementations where the user would be required to unset and reset an anchoring system. Still further, the height of the lift system may be quickly and readily adjusted by adjusting the height of the scissor lift, thereby raising or lowering the track system and the lift assist device. Because the lift assist device is configured to lift objects not of excessive weight (for example, blocks weighing not more than 150 pounds), the lift assist device may be securely mounted to the track system as disclosed herein and the track system and lift device may be securely coupled over the lift and configured to be raised and lowered by the lift without compromising the stability of the lift system.

In various implementations of the lifting system disclosed herein, the lifting system may have an unexpectedly good results on the productivity of a masonry crew building walls. For example, a 3 man masonry crew without a lifting system can lay approximately 540 76 pound blocks per day. When the same 3 man crew uses an implementation of a lifting system disclosed herein, the 3 man crew with the lifting system can lay 1000-1500 76 pound blocks per day. Accordingly, a single lifting system can improve the productivity of a 3 man lifting crew by approximately a factor of 1.9-2.8. Further, the lifting system may improve the consistency of a mason. Because the lifting system can assume the majority of the lifting of blocks, a mason can better maintain stamina without having less productive days due to the need to physically recover from a substantial amount of lifting the day before.

In places where the description above refers to particular implementations of lifting systems and implementing components, sub-components, methods and sub-methods, it should be readily apparent that a number of modifications may be made without departing from the spirit thereof and that these implementations, implementing components, sub-components, methods and sub-methods may be applied to other lifting systems.

What is claimed is:

1. A lifting system comprising:

a lift assist device moveably coupled to and on a first track and a second track, the lift assist device comprising an arm coupled to a mast, a base coupled to the mast, four wheels coupled to the base and configured to roll along the first track and the second track, and four plates adjacent to the four wheels;

a lift coupled to and configured to raise the first track and the second track; and a drive system coupled within the base of the lift assist device, wherein the drive system is configured to move the lift assist device along the first track and the second track;

wherein the four wheels are configured to roll on top of the first track and the second track while bearing an entire weight of the lift assist device; and wherein each wheel of the four wheels comprises a recess extending around an outer circumference of each wheel, the recess configured to receive one of the first track or the second track; and wherein each wheel is adjacent to a plate of the four plates, each plate extending one of below or level with an adjacent wheel.

2. The lifting system of claim 1, wherein the lift assist device is programmable to apply a lifting force equal to an amount of weight of an item coupled to a load attachment mechanism of the lift assist device.

3. The lifting system of claim 1, wherein the drive system comprises a motor coupled within the base of the lift assist device.

4. The lifting system of claim 1, wherein the lifting system comprises a stop configured to prevent movement of the lift assist device from off of the first track and the second track.

5. The lifting system of claim 1, wherein the lift is a scissor lift.

6. The lifting system of claim 1, wherein the first track and the second track each comprise a length of 16-24 feet.

7. The lifting system of claim 1, wherein the drive system is configured to be operated by a user remotely.

8. A lifting system comprising:

a lift assist device moveably coupled to and along a first track and a second track, the lift assist device comprising an arm coupled to a mast, a base coupled to the mast and four wheels coupled to the base and configured to roll along the first track and the second track;

a track system comprising the first track and the second track and a plurality of supports directly coupled to the first track and the second track and coupled over and orthogonal to a first lift track, a second lift track, a third lift track, and a fourth lift track;

a scissor lift comprising a first arm directly and moveably coupled to the first lift track, a second arm directly and moveably coupled to the second lift track, a third arm directly and moveably coupled to the third lift track, and a fourth arm directly and moveably coupled to the fourth lift track; and a drive system coupled within the base of the lift assist device;

wherein the drive system is configured to move the lift assist device along the first track and the second track;

wherein the drive system comprises a motor coupled to a first gear and a second gear, wherein the second gear is fixedly coupled to an axle shaft, wherein the axle shaft is fixedly coupled to a third gear, wherein the third gear is configured to rotate along a gear track fixedly coupled to one of the first track or the second track.

9. The lifting system of claim 8, wherein the plurality of supports comprise five track supports directly coupled to both the first track and the second track.

10. The lifting system of claim 8, wherein the drive system is electrical.

11. The lifting system of claim 10, wherein the lift assist device is electrical.

12. The lifting system of claim 8, wherein each wheel of the four wheels is coupled between two plates.

* * * * *